United States Patent
Seelig et al.

(10) Patent No.: US 9,461,399 B2
(45) Date of Patent: Oct. 4, 2016

(54) CHARGING CABLE CONNECTOR

(71) Applicant: PHOENIX CONTACT E-Mobility GmbH, Schieder (DE)

(72) Inventors: Marco Seelig, Leopoldshoehe (DE); Martin Kneidl, Detmold (DE)

(73) Assignee: PHOENIX CONTACT E-MOBILITY GMBH, Schieder (DE)

( * ) Notice: Subject to any disclaimer, the term of this patent is extended or adjusted under 35 U.S.C. 154(b) by 36 days.

(21) Appl. No.: 14/549,569

(22) Filed: Nov. 21, 2014

(65) Prior Publication Data

US 2015/0147919 A1    May 28, 2015

(30) Foreign Application Priority Data

Nov. 28, 2013  (DE) .................. 10 2013 019 882

(51) Int. Cl.
| | | |
|---|---|---|
| *H01R 13/04* | (2006.01) | |
| *H01R 13/58* | (2006.01) | |
| *H01R 13/506* | (2006.01) | |
| *B60L 11/18* | (2006.01) | |
| *H01R 13/56* | (2006.01) | |

(52) U.S. Cl.
CPC ....... *H01R 13/5804* (2013.01); *B60L 11/1818* (2013.01); *H01R 13/506* (2013.01); *B60L 2270/32* (2013.01); *B60L 2270/34* (2013.01); *H01R 13/562* (2013.01); *H01R 2201/26* (2013.01); *Y02T 10/7005* (2013.01); *Y02T 10/7072* (2013.01); *Y02T 90/14* (2013.01)

(58) Field of Classification Search
USPC ............................................... 439/692, 695
See application file for complete search history.

(56) References Cited

U.S. PATENT DOCUMENTS

| | | | | |
|---|---|---|---|---|
| 7,878,866 | B1* | 2/2011 | Kwasny .............. | B60L 11/1818 439/474 |
| 8,834,202 | B2* | 9/2014 | Kwasny .............. | B60L 11/1818 439/604 |
| 2013/0012054 | A1* | 1/2013 | Andresen ............ | B60L 11/1818 439/476.1 |
| 2013/0052853 | A1* | 2/2013 | Natter .................. | H01R 13/506 439/345 |

(Continued)

FOREIGN PATENT DOCUMENTS

| | | |
|---|---|---|
| DE | 202010011857 U1 | 10/2010 |
| DE | 102011002024 A1 | 10/2012 |

(Continued)

*Primary Examiner* — Tho D Ta
(74) *Attorney, Agent, or Firm* — Leydig, Voit & Mayer, Ltd.

(57) ABSTRACT

A charging cable connector including an electrically-connector connector unit, a receptacle housing enclosing at least some sections of the connector unit, a charging cable connector section and a strain relieving device. The receptacle housing is a multi-part design and further includes a housing base section of closed outer surface design and a connector aperture. The housing base section is configured to accommodate the connector unit. The connector unit is accessible via the connecting aperture, where the connecting aperture is formed as part of the housing base section. The charging cable connector section is provided apart from the connecting aperture and further includes a charging cable connecting aperture. The charging cable connector section is configured to accommodate a charring cable. The charging cable includes a strain-relieving device, where the charging cable is configured to be guide via the charging cable connecting aperture into the receptacle housing.

20 Claims, 8 Drawing Sheets

(56) References Cited

U.S. PATENT DOCUMENTS

2014/0106586 A1   4/2014   Boeck et al.
2014/0320082 A1   10/2014  Mott et al.

FOREIGN PATENT DOCUMENTS

| | | |
|---|---|---|
| DE | 102012209907 A1 | 12/2012 |
| DE | 102012016641 A1 | 2/2013 |

* cited by examiner

CHARGING CABLE CONNECTOR

CROSS-REFERENCE TO RELATED APPLICATIONS

This application claims priority from German Patent Application No. DE 10 2013 019 882.8 filed Nov. 28, 2013, which is hereby incorporated by reference herein in its entirety.

FIELD

The invention relates to a charging cable connector comprising an electrically-connected connector unit designed for connection to a mating connector unit, comprising a receptacle housing encompassing at least some sections of the connector unit, with a connecting aperture, via which the connector unit is accessible, and/or is guided out of the receptacle housing, and with a charging cable connecting aperture provided spaced apart from the connecting aperture, and also comprising a strain-relieving device for a charging cable guided via the charging cable connecting aperture into the receptacle housing.

BACKGROUND

For the purpose of charging an electric vehicle various standardised charging interfaces exist. Depending upon the interface specification in question the electric vehicle can be charged with different currents and with different voltages. For the purpose of charging the electric vehicle is connected via a charging cable with a charging station providing the electrical energy. The charging cable, which provides at one end at least one charging cable connector is embodied according to the currents and/or voltages with different cable cross-sections. From this it ensues that as a result of the different cable cross-sections the outer diameters of the charging cables vary considerably. In order to ensure a defined guidance of the charging cable out of the charging cable connector, the contour of the charging cable connector and in particular the charging cable connecting aperture provided on the connector housing is matched to the outer diameter in question. For this reason a large number of different connector housings exist for the variously specified charging cables.

Although in practice housings for charging cable connectors formed from two half-shells are of known art, it is receptacle housings for charging cable connectors that have in particular proved themselves. Since the receptacle housing is embodied such that it is closed on its outer surface, the charging cable before the assembly of the electrically-connected connector unit must be guided via the charging cable connecting aperture into the receptacle housing.

SUMMARY

A charging cable connector includes an electrically-connector connector unit, a receptacle housing enclosing at least some sections of the connector unit, a charging cable connector section and a strain relieving device. The receptacle housing is a multi-part design and further includes a housing base section of closed outer surface design and a connector aperture. The housing base section is configured to accommodate the connector unit. The connector unit is accessible via the connecting aperture, where the connecting aperture is formed as part of the housing base section. The charging cable connector section is provided apart from the connecting aperture and further includes a charging cable connecting aperture. The charging cable connector section is configured to accommodate a charring cable. The charging cable includes a strain-relieving device, where the charging cable is configured to be guide via the charging cable connecting aperture into the receptacle housing.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

In an embodiment, the present invention provides a charging cable connector with a receptacle housing such that the cable outlet for various cable diameters is variably configured and the assembly of the housing is simplified.

In an embodiment of the invention, the receptacle housing is of a multi-part design, and in all circumstances has a housing base section of closed outer surface design and also a charging cable connector section, wherein the housing base section serves the purpose of accommodating the connector unit and has the connecting aperture, and wherein the charging cable connector section provides the charging cable connecting aperture and is designed for the purpose of accommodating the charging cable.

The particular advantage of the invention consists in the fact that by the provision of what is at least a two-part receptacle housing a housing base section that is always the same and matched with the connector unit is connected with a charging cable connector section. Here the charging cable connector section can be matched with the charging cable diameter in question. The housing base section is in this respect designed as the same part for all charging cable connectors. Only the charging cable connector section is configured specifically for each configuration.

In particular cost advantages ensue as a result of using the same housing base section. The cost advantages are particularly significant if the charging cable connector section is configured in a simple geometrical manner and important functional features of the charging cable connector that are independent of the electrical operating parameters are always implemented in the same housing base section. For example, a holding grip, or a grip recess in the charging cable connector, can be implemented as part of the housing base section. Similarly means for fixing the charging cable connector on a mating connector unit of an electrical vehicle or a charging station, can be provided on the housing base section.

In accordance with an embodiment of the invention the connecting aperture of the receptacle housing assigned to the connector unit is provided on the housing base section. The housing base section is in this respect designed as a type of receptacle housing that is closed on its outer surface and is embodied in one piece. In contrast the charging cable connecting aperture, which must be embodied to be of various sizes for the variously dimensioned charging cables, is implemented as part of the charging cable connector section.

For the purpose of connecting the housing base section with the charging cable connector section the usual means of connection such as screws or clamps can, for example, be provided. Exact location of the bodies relative to one another can in particular be ensured via positioning elements formed on the housing base section and the charging cable connector section respectively. The housing base section and the charging cable connector section can, for example, be implemented as plastic parts, and can be manufactured in an injection casting method.

In accordance with a preferred form of embodiment of the invention means of connection can be provided that allow an assembly of the charging cable connector section with the housing base section without the use of tools. The housing base section can, for example, be screwed onto the charging cable connector section. For this purpose corresponding threads can be formed directly on the housing base section and on the charging cable connector section. For example, a clip-on joint can be provided for the purpose of connecting the charging cable connector section with the housing base section.

In particular the charging cable connector section and the housing base section can be fixed to one another such that they can be released. Rapid means of connection can, for example, be provided in order to simplify the assembly of the receptacle housing. For example, a bayonet coupling with a lead-in groove on the charging cable connector section and a correspondingly configured projection on the housing base section can be provided as a rapid means of connection; this allows the charging cable connector section to be fixed onto the housing base section by means of a combined in-feed and rotation movement.

In accordance with a further development of the invention a security section can be positioned on the charging cable connector section for the purpose of implementing the strain-relieving device for the charging cable. For this purpose the security section can have at least one elastically-deformable security element, which, in an assembled position of the security section, in which the security section is fixed onto the charging cable connector section, is clamped against the charging cable, and the charging cable is thus fixed in the receptacle housing without any tensile load. In particular provision can be made, during the positioning of the security section on a charging cable connector section, for the security element, and/or sheathing of the charging cable, to be elastically deformed and as a result of the elastic deformation the charging cable is fixed in the charging cable connector section. The elastic deformation of the security element can, for example, be implemented in terms of an inclined plane, i.e. a wedge surface.

The security section can, for example, be fixed via a clip-on joint onto the charging cable connector section or the housing base section. As part of the clip-on joint an elastically-deformable retaining arm can be provided with a hook-shaped projection on its free end, as can a latching edge gripped by the hook-shaped projection in the assembled position of the security section. The elastically-deformable retaining arm with the hook-shaped projection can, for example, be implemented as part of the charging cable connector section or as part of the security section. The latching edge will be correspondingly provided on the security section or the charging cable connector section.

In accordance with a development of the invention a locking section with at least one locking element for the clip-on joint can be provided as a further component of the receptacle housing. The locking section is fixed on the security section or on the charging cable connector section such that the locking element of the locking section engages with an assembly aperture for the clip-on joint formed between the security section and the charging cable connector section. Here the locking element is dimensioned with respect to the assembly aperture such that the elastically-deformable retaining arm of the clip-on joint of the security section is locked if the security section is assembled and fixed in position. A disassembly, i.e. a release of the security section, is then not possible. Advantageously a misuse or manipulation of the charging cable connector is effectively prevented by this means.

By the provision of a further clip-on joint for the security section and the locking section the whole receptacle housing can be configured such that disassembly becomes impossible. For this purpose the further clip-on joint is, for example, designed between the locking section and security section such that after a once-only clipping together of the connection the section can no longer be released. For example, the further clip-on joint can be arranged to be inaccessible after the fixing of the locking section on the security section in the receptacle housing.

In accordance with a development of the invention a guide element is provided on the security section, and/or on the locking section, which in the assembled position of the security section engages in an assembly recess of the housing base section. By this means the positioning of the security section relative to the housing base section is advantageously simplified. At the same time the correctness of the assembly of the bodies can be checked in a simple manner. The assembly has taken place correctly if the guide element is inserted as intended in the assembly recess.

In accordance with a development of the invention the assembly recess is designed on the housing base section in an elongated form, and/or in the form of a groove. Advantageously the guide element, which is provided on the security section, is already guided during assembly into the groove-shaped assembly recess. In this respect there ensues during the whole assembly process a relative location alignment between security section and housing base section. By this means incorrect assembly is prevented. The security section can, in particular, be positioned and fixed on the charging cable connector section, and/or the housing base section, by means of a linear positioning movement.

In accordance with a development of the invention a seating face for a charging cable seal is provided on an internal recess of the charging cable connector section. Any entry of moisture into the receptacle housing is advantageously prevented by the provision of the charging cable seal. Moreover there ensues as a result of the provision of the charging cable seal a functional separation on the charging cable connector section. The charging cable connector section defines the mechanical-structural interfaces for the accommodation of the charging cable. In particular the charging cable is fixed and sealed in the charging cable connector section. A ring seal is, for example, provided as the charging cable seal. In contrast the electrical functional elements and in particular the connector unit are included in the housing base section and electrical connections are made in the housing base section.

Figure 1:
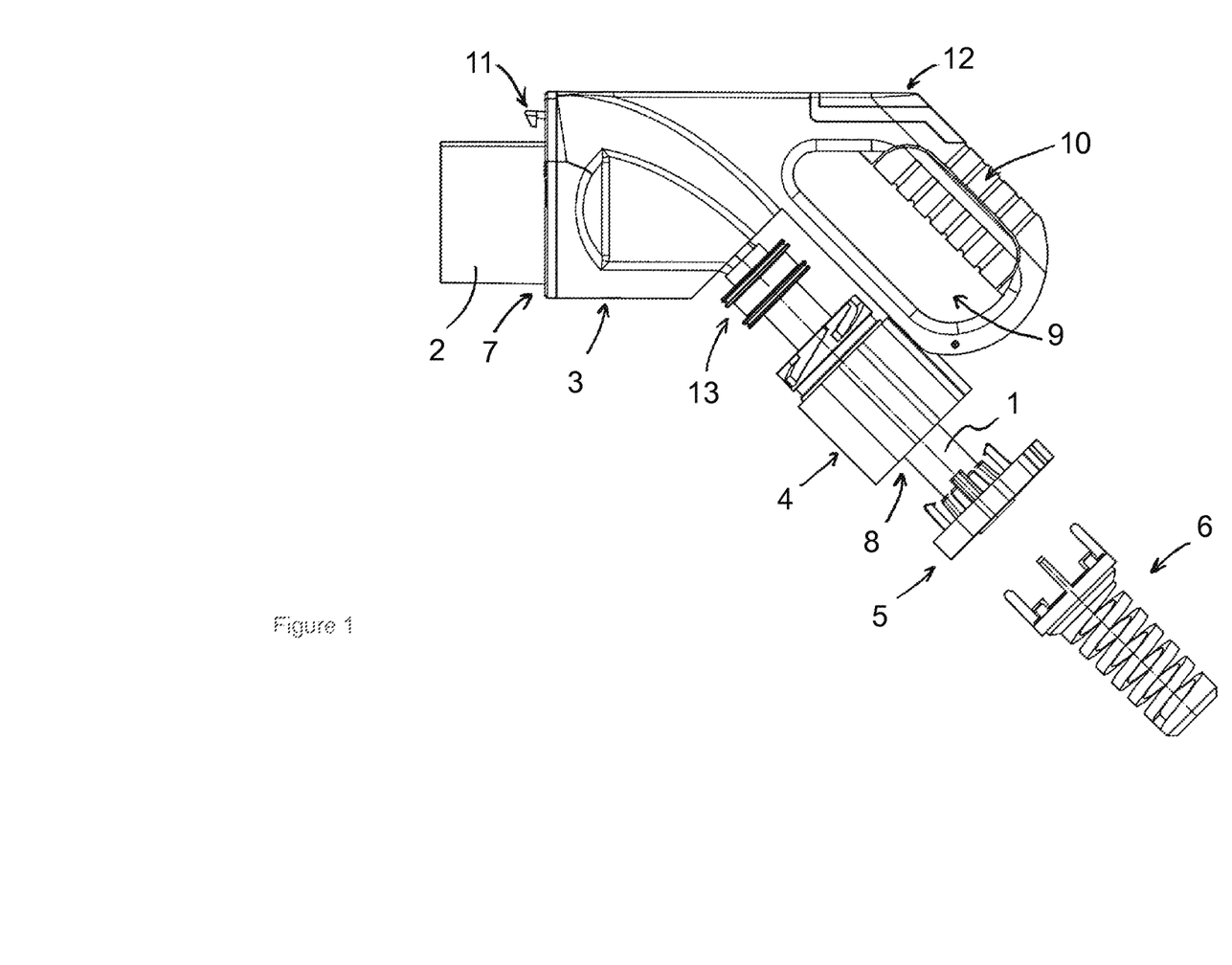
FIG. 1 shows a side view of a charging cable connector with an inventive receptacle housing of multi-part design in an exploded view.
Figure 2:
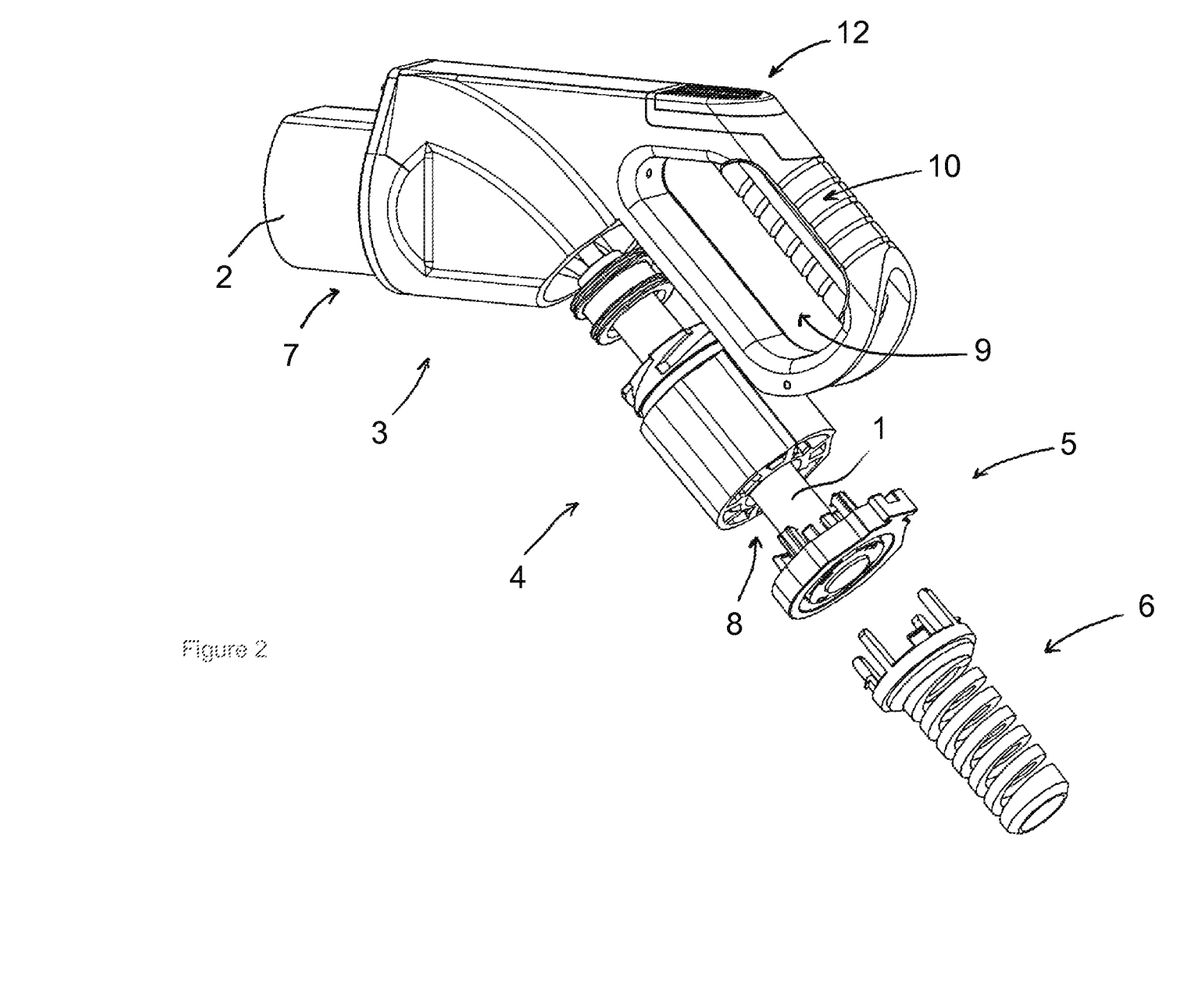
FIG. 2 shows a view of the charging cable connector in perspective.

An inventive charging cable connector in accordance with FIGS. 1 and 2 has as essential components a receptacle housing of multi-part design, a charging cable 1 and an electrically-connected connector element, sections of which are provided in the receptacle housing. The connector element comprises a connector face 2, and, held in the connector face 2, electrical connections, not represented, for the purpose of electrically connecting the charging cable connector with a mating connector unit, not represented, of an electric vehicle, e.g. with a charging station. In accordance with the invention the receptacle housing is embodied as a multi-part receptacle housing. It comprises a housing base section 3 accommodating the connector unit with the connector face 2 and the electrical connections, a charging cable connector section 4 that can be fixed onto the housing base section 3, and also a security section 5 and a locking section 6. The housing base section 3, which is embodied as a form of receptacle housing that is closed on its outer surface, has a connecting aperture 7 for the connector unit. The connector face 2 of the connector unit projects out of the housing base section 3 via the connecting aperture 7 such that it can be inserted into the mating connector unit for the purpose of mechanical and electrical connection. Furthermore a charging cable connecting aperture 8 for the charging cable 1 is provided on the charging cable connector section 4.

In the form of embodiment shown here a grip recess 9 and a handle 10 are formed on the housing base section 3 as a means of manipulating the charging cable connector. In addition an attachment lug 11 and an actuation element 12 assigned to the attachment lug 11, for the purpose of unlatching the attachment lug 11, are provided on the housing base section 3. The attachment lug 11 serves to provide the mechanical connection and fixing of the charging cable connector onto the mating connector unit. To this end the attachment lug 11 engages with a latching element on the mating connector unit, and can be raised via the actuation element 12 for the purpose of releasing the engagement with the latching element.

In addition a charging cable seal 13 is provided as part of the charging cable connector. The charging cable seal 13 surrounds the charging cable 1 and is held in the charging cable connector section 4. Further seals, which in the present instance are not represented in the interests of clarity, can, for example, be provided between the connector face 2 and the housing base section 3 in the region of the connecting aperture 7, and between the housing base section 3 and the charging cable connector section 4. For the charging cable seal 13 an annular seating face 18, formed so as to accommodate the seal 13, is provided on an internal recess 36 of the charging cable connector section 4. The seating face 18 promotes a simple and precise assembly of the charging cable seal 13 in the charging cable connector section 4.

The charging cable connector section 4 can be fixed onto the housing base section 3 via a bayonet coupling with a combined in-feed and rotation movement. For this purpose engagement grooves 14 designed in the form of a thread are provided on the outer surface of the charging cable connector section 4. Correspondingly the housing base section 3 has projections 15 in the form of thread segments, which are inserted into the engagement grooves 14 of the charging cable connector section 4 so as to fix the charging cable connector section 4 onto the housing base section 3. The security section 5 is fixed onto the charging cable connector section 4 by means of a clip-on joint. Furthermore the locking section 6 is fixed onto the security section 5 by means of a further clip-on joint.

Figure 3:
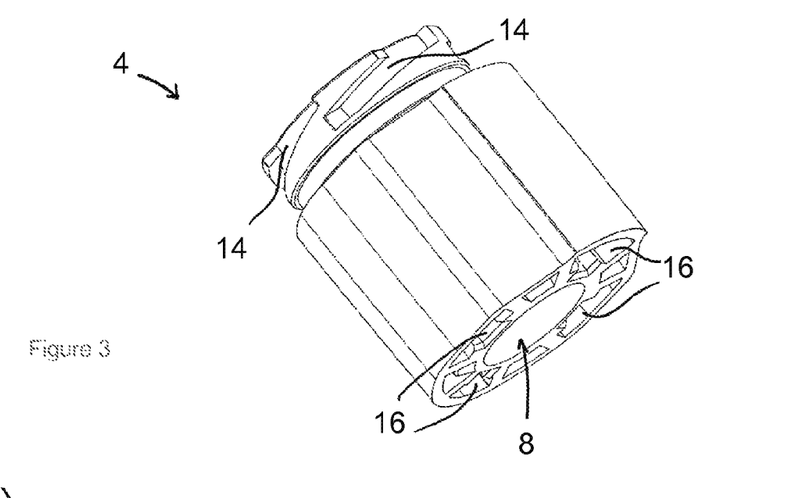
FIG. 3 shows a detailed representation of a charging cable connector section of the charging cable connector in perspective.
Figures 4, 5:
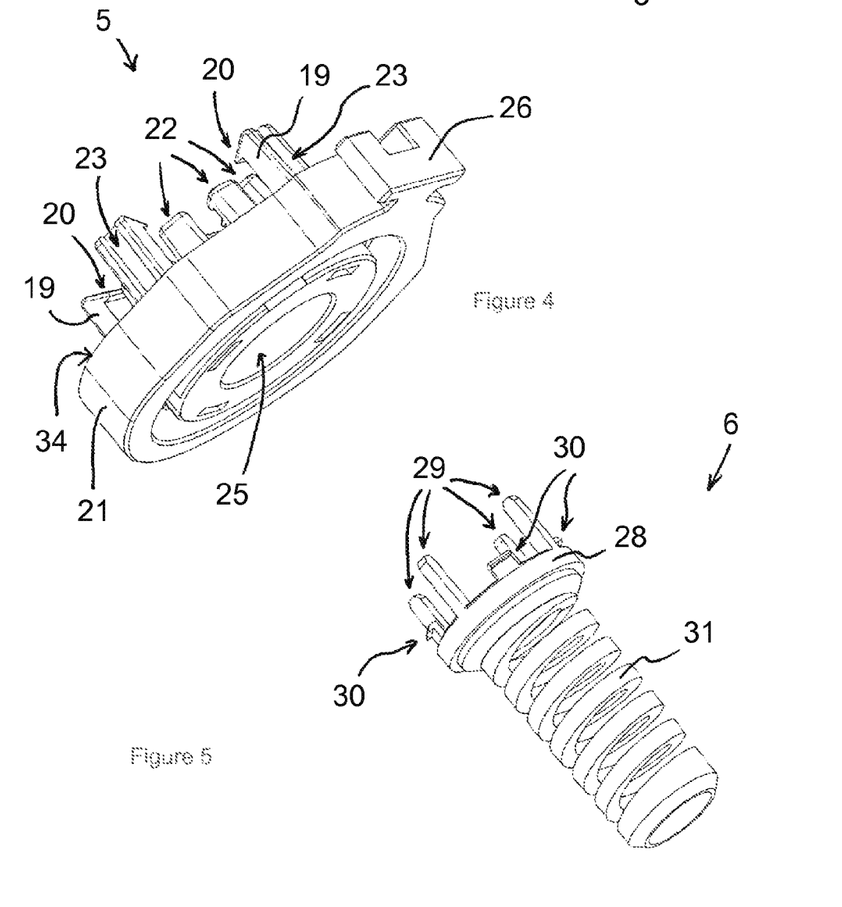
FIG. 4 shows a detailed representation of a security section of the charging cable connector in perspective.
FIG. 5 shows a detailed representation of a locking section of the charging cable connector in perspective.

Details of the charging cable connector section 4, the security section 5 and the locking section 6, are reproduced in FIGS. 3 to 5 and in the subsequent assembly drawings. The charging cable connector section 4 has the charging cable connecting aperture 8 on an end face located opposite to the engagement grooves 14. In the region of the charging cable connecting aperture 8 is formed a truncated cone-shaped, or cone-shaped, inner surface 32, which serves to locate and support the security section 5 on the charging cable connector section 4. At the same time the truncated cone-shaped tapering of the charging cable connecting aperture 8 allows the charging cable 1 to be fed through in a particularly simple manner. As a result of its essentially cylindrical outer geometry the charging cable connector section 4 can be fixed onto the housing base section 3 via the bayonet coupling in a particularly simple manner by means of the combined in-feed and rotation movement. The charging cable connecting aperture 8 is surrounded by a total of four longitudinal recesses 16 provided for the assembly of the security section 5. A latching edge 17 is provided in the region of the longitudinal recesses 16 in the interior of the charging cable connector section 4 as part of the clip-on joint.

The security section 5, which can be positioned on the charging cable connector section 4 and fixed onto the latter, forms, together with the charging cable connector section 4, a strain-relieving device for the charging cable 1. As a formative component the security section 5 has a disk element 21 of annular design with a cylindrical passage 25 for the charging cable 1. For the purpose of fastening the security section 5 onto the charging cable connector section 4 four elastically-deformable retaining arms 19, arranged distributed around the periphery, are provided in the first instance. Hook-shaped projections 20 are provided on the free ends of the retaining arms 19. The hook-shaped projections 20 are designed such that in an assembled position of the security section 5 they grip around the latching edge 17 provided on the charging cable connector section 4. Secondly, security elements 22 are provided that are projecting from the end face of the disk element 21. The security elements 22 are likewise provided distributed around the periphery of the disk element 21 of the security section 5. A radially outwards-oriented rear face 23 of the security elements 22 is of an inclined design corresponding to the cone shape of the charging cable connecting aperture 8. On a free end facing away from the disk element 21 the security elements 22 provide seating projections 24, via which the security elements 22 locate against the charging cable 1.

A guide element 26 projecting radially from the disk element 21 is also provided on the security section 5. The guide element 26 is positioned and shaped such that it is inserted in a dovetail manner into an assembly recess 27 formed on the housing base section 3 in the region of the grip recess 9, and guided into the latter.

The locking section 6 is designed to be symmetrical with respect to a central axis. It comprises a centrally provided security ring 28 with a passage 35 for the charging cable 1, as well as four locking elements 29 of slender design projecting in the axial direction from the security ring 28. The locking elements 29 are evenly distributed around the periphery of the security ring 28. Between each pair of adjacent locking elements 29 is provided a retaining arm 30 of the further clip-on joint, designed so as to connect the locking section 6 with the security section 5. A total of four retaining arms 30 are evenly distributed around the security ring 28, each alternating with the locking elements 29. The locking elements 29 and the retaining arms 30 project from the same end face of the security ring 28 of the locking section 6.

Located opposite the locking elements 29 and the retaining arms 30 a kink protection segment 31 for the charging cable 1 is formed on the security ring 28. The kink protection segment 31 is formed from a spirally wound plastic section. The security ring 28, the locking elements 29, the retaining arms 30 and the kink protection segment 31 are designed as one piece.

Figure 6:
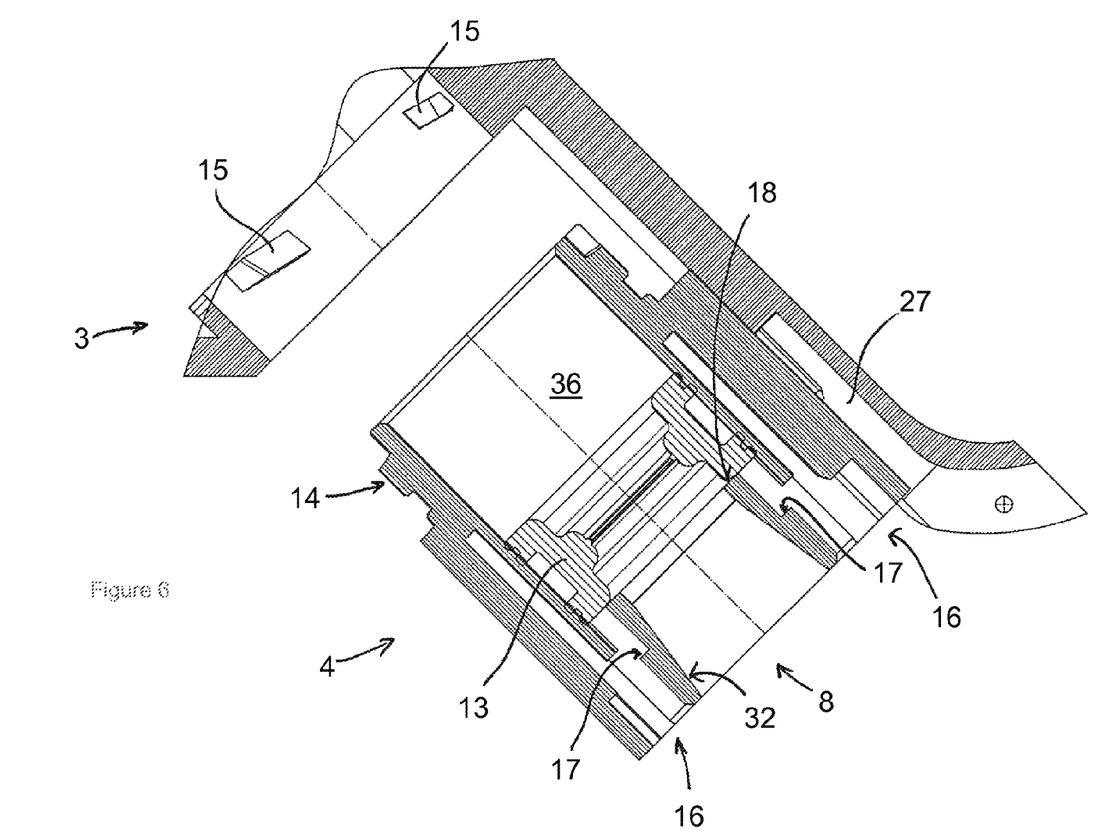
FIG. 6 shows a first step in the assembly of the inventive charging cable connector in a sectioned view.
Figure 7:
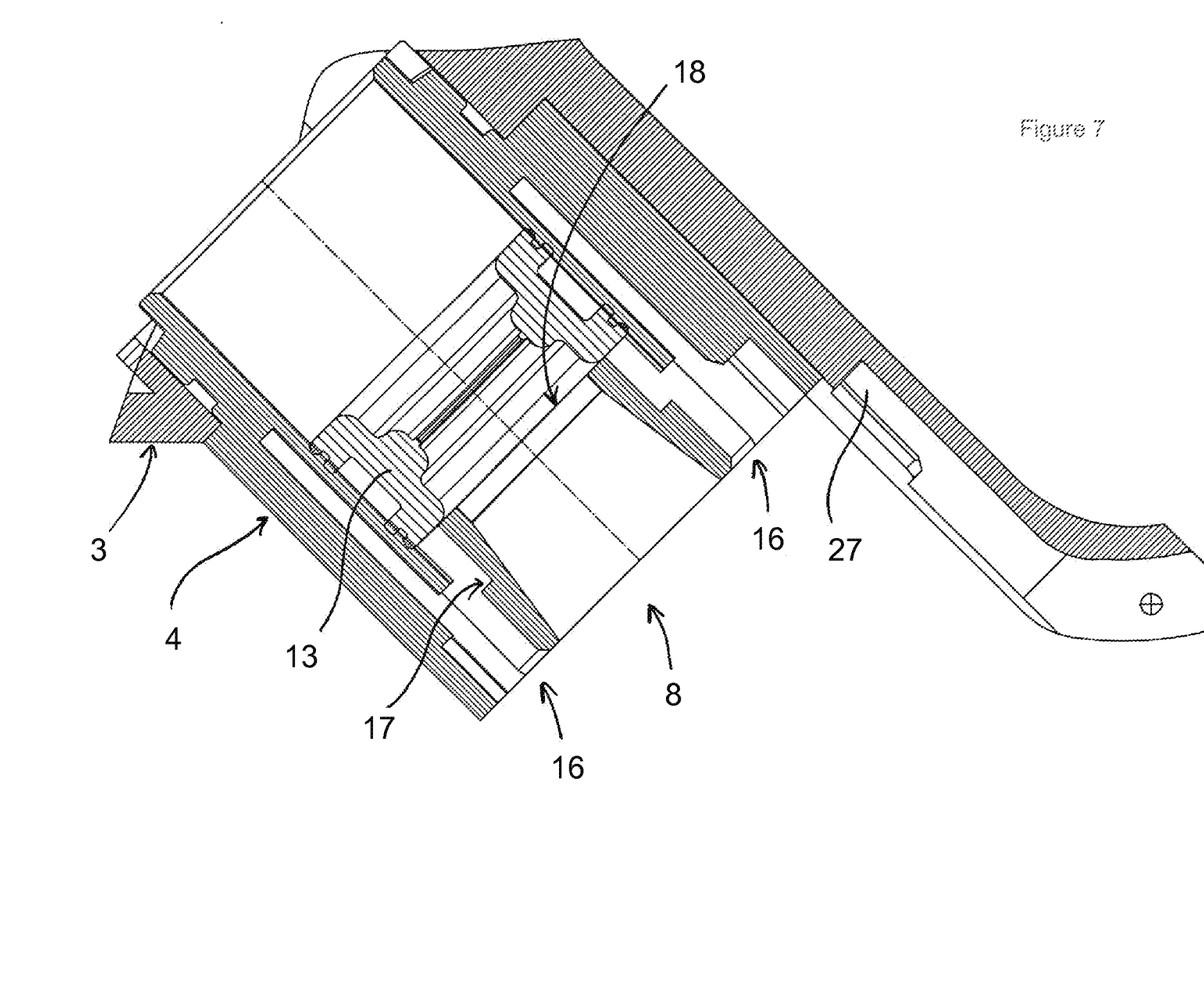
FIG. 7 shows a second step in the assembly of the inventive charging cable connector in a sectioned view.

For the purpose of assembling the charging cable connector, the locking section 6, the security section 5, the charging cable connector section 4, the charging cable seal 13, and also the housing base section 3, and any other seals that are not represented, are firstly fitted onto the charging cable 1 and the connector unit is electrically-connected with the charging cable 1. The connector unit is then fixed onto the housing base section 3. Then, as represented in FIGS. 6 and 7, the charging cable connector section 4, with the charging cable seal 13 located in the latter, is fixed via the bayonet coupling onto the housing base section 3.

Figure 8:
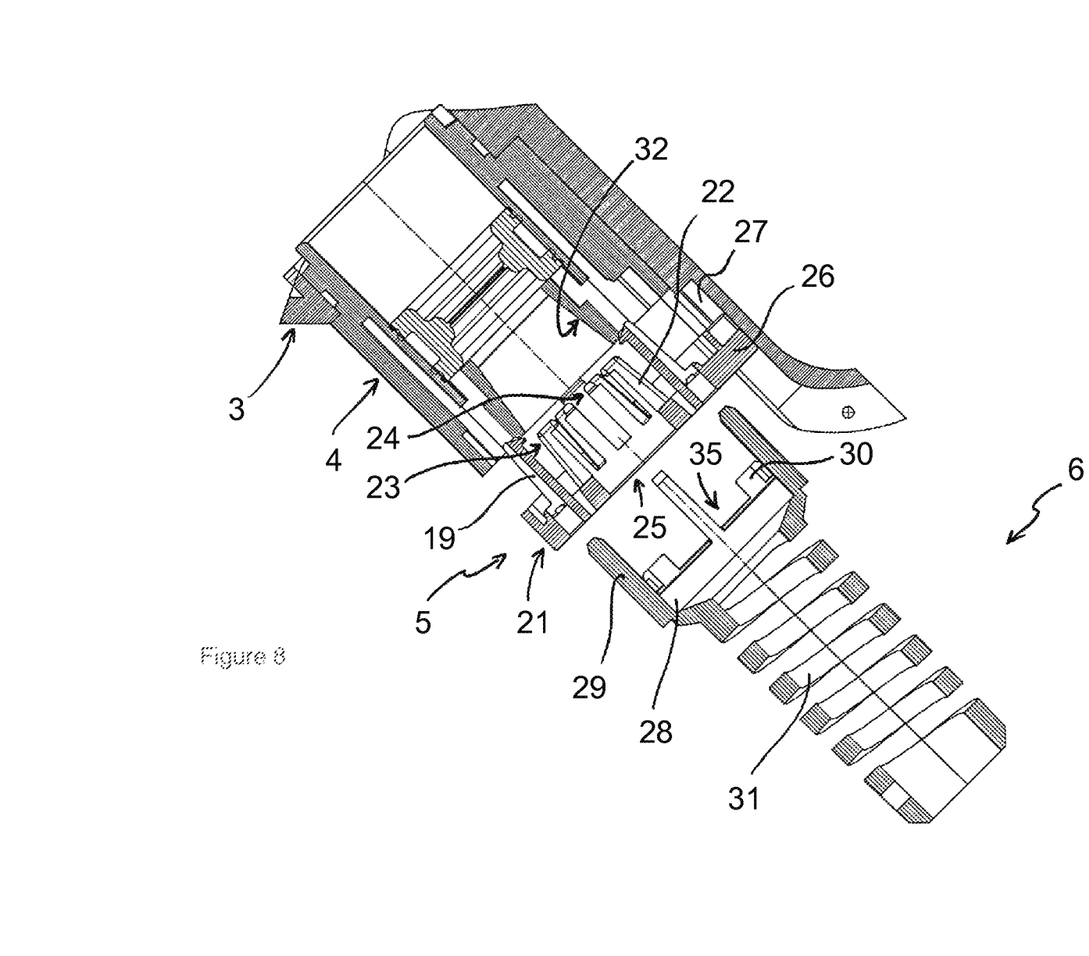
FIG. 8 shows a third step in the assembly of the inventive charging cable connector in a sectioned view.

In the next step of the assembly, which is represented in FIG. 8, the security section 5 is positioned on the charging cable connector section 4. For this purpose the guide element 16 of the security section 5 is introduced into the assembly recess 27 of the housing base section 3 and positioned along the assembly recess 27 on the charging cable connector section 4. In the course of assembly the retaining arms 19 engage with the longitudinal recess 16 of the charging cable connector section 4.

An assembled position of the security section 5 is achieved when the hook-shaped projections 20 of the retaining arms 19 grip around the latching edge 17 provided on the charging cable connector section 4. In this assembled position, shown in FIG. 9, the elastically formed security elements 22 of the security section 5 are supported with their rear faces 23 on the conical inner surface 32 of the charging cable connecting aperture 8. Here the seating projections 24 lie on the outer surface of the charging cable 1 and press into the elastic sheathing of the charging cable 1 such that the charging cable 1 is fixed in the charging cable connector section 4 in a strain-relieved manner.

Figure 9:
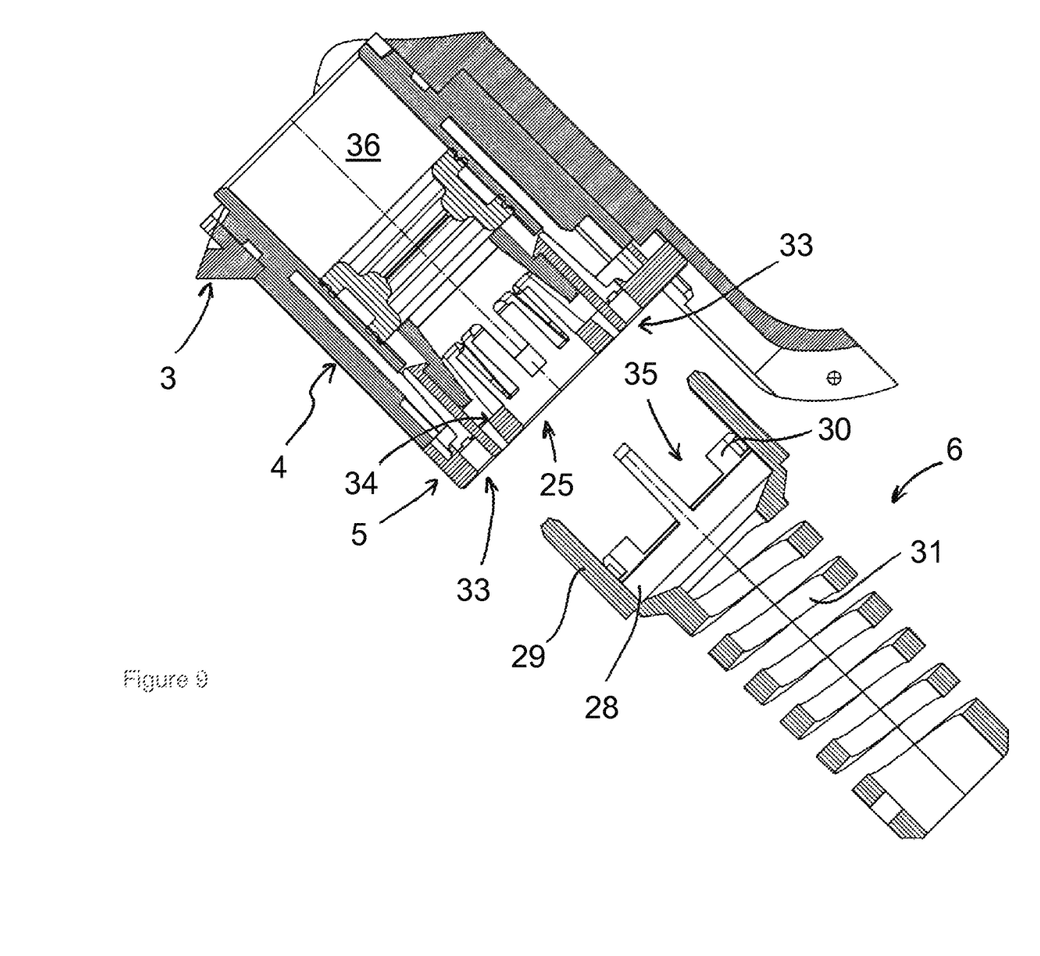
FIG. 9 shows a fourth step in the assembly of the inventive charging cable connector in a sectioned view.
Figure 10:
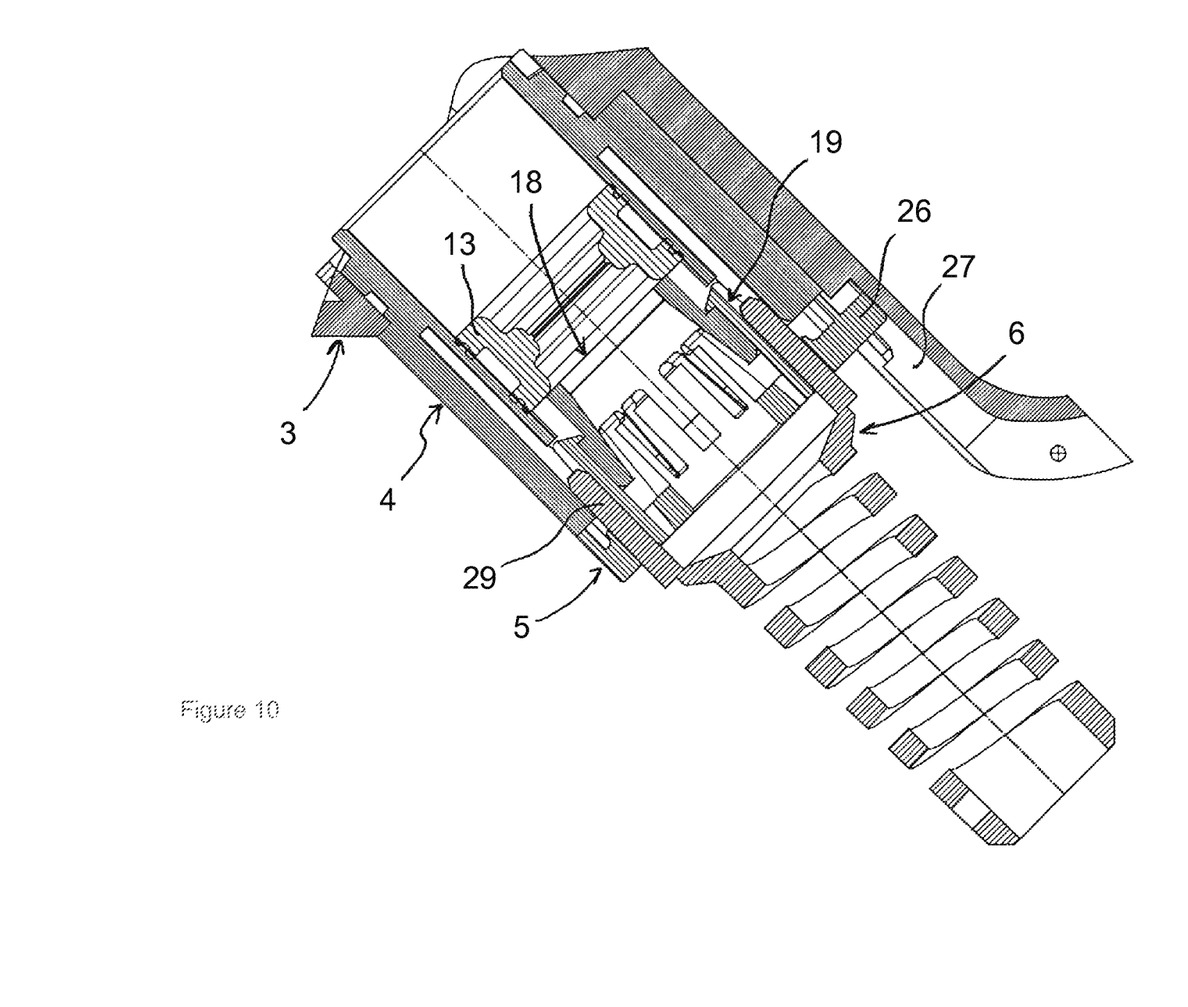
FIG. 10 shows an assembly drawing of the inventive charging cable connector in a sectioned view.

As is also clear in FIG. 9, in the assembled position of the security section 5 an assembly aperture 33 is formed between the security section 5 and the charging cable connector section 4. The locking section 6 is now inserted, with the locking elements 29 forward, into the assembly aperture 33. Here the retaining arms 30 of the locking section 6 grip around the disk element 21 of the security section 5 and are located against a flat surface 34 facing towards the charging cable connector section 4. By introducing the locking elements 29 into the assembly aperture 33, the retaining arm 19 of the security section 5 is locked, as represented in FIG. 10. In this respect the clip-on joint formed between the charging cable connector section 4 and the security section 5 cannot be released after the locking section 6 has been fixed in position.

Since, in the assembled state of the locking section 6, the flat surface 34 of the disk element 21 facing towards the charging cable connector section 4, and also the retaining arms 30, are arranged in the receptacle housing of the charging cable connector such that they are inaccessible, the charging cable connector can be assembled only once, and cannot subsequently be disassembled. In this respect it is ensured that assembly of the charging cable connector can similarly be executed simply and quickly, and that the assembled charging cable connector cannot be subsequently disassembled without incurring damage. In this respect any misuse and manipulation of the charging cable connector is prevented.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SYMBOLS

1 Charging cable
2 Connector face
3 Housing base selection
4 Charging cable connector section
5 Security section
6 Locking section
7 Connecting aperture
8 Charging cable connecting aperture
9 Grip recess
10 Handle
11 Attachment lug
12 Actuation element
13 Charging cable seal
14 Engagement groove
15 Projection
16 Longitudinal recess
17 Latching edge 18 Sealing face
19 Retaining arm
20 Hook-shaped projection
21 Disk element
22 Security element
23 Rear face
24 Seating projection
25 Passage
26 Guide element
27 Assembly recess
28 Security ring
29 Locking element
30 Retaining arm
31 Kink protection segment
32 Conical inner surface
33 Assembly aperture
34 Flat surface
35 Passage
46 Internal recess

What is claimed is:

1. A charging cable connector comprising:
an electrically-connecting connector unit; and
a multi-part receptacle housing configured to enclose at least a portion of the electrically-connecting connector unit, the multi-part receptacle housing comprising:
a housing base section of closed outer surface design, the housing base section configured to accommodate the electrically-connecting connector unit and including connecting aperture via which the electrically-connecting connector unit is at least one of accessible or guided out of the multi-part receptacle housing; and
a first charging cable connector section spaced apart from the connecting aperture and configured to accommodate a charging cable, the first charging cable connector section including a charging cable connecting aperture,
wherein the charging cable connecting aperture is configured to receive the charging cable, and guide the charging cable into the multi-part receptacle housing where it can be connected with the electrically-connecting connector unit, and
wherein the housing base section and the first charging cable connector section divide the multi-part receptacle housing into two parts at a position along a length of the multi-part receptacle housing.

2. The charging cable connector recited in claim 1, wherein the charging cable connector section is configured to be fixed via a connection device to the housing base section without any tools.

3. The charging cable connector recited in claim 2, wherein the connection device is configured to releasably connect the charging cable connector section to the housing base section.

4. The charging cable connector recited in claim 1, wherein the charging cable connector section is connected to the housing base section via a thread.

5. The charging cable connector recited in claim 1, wherein the charging cable connector section is connected to the housing base section via a bayonet coupling.

6. The charging cable connector recited in claim 1, wherein a security section is positioned on the charging cable connector section and is configured to implement a strain-relieving device for the charging cable.

7. The charging cable connector recited in claim 6, wherein the security section includes a security element such that, in an assembly position of the security section in which the security section is fixed onto the charging cable section, the security element is at least one of supported against the charging cable connector section or clamped against the charging cable such that the charging cable is fixed in the receptacle housing in a strain-relieved state.

8. The charging cable connector recited in claim 7, wherein when in the assembly position of the security section, the security section is fixed via a clip-on joint onto at least one of the charging cable connector section or the housing base section, the clip-on joint having an elastically-deformable retaining arm with a hook-shaped projection and a latching edge gripped in the assembled position by the hook-shaped projection.

9. The charging cable connector recited in claim 8, wherein a truncated cone-shaped inner surface is formed on the charging cable connector section in the region of the charging cable connecting aperture, the cone-shaped inner surface abutting the security element of the security section in the assembled position.

10. The charging cable connector recited in claim 8, wherein a locking section with at least one locking element is provided and can be positioned on at least one of the security section or the charging cable section, such that the locking element of the locking section engages with an assembly aperture for the clip-on joint, the assembly aperture formed between the security section and the charged section, and configured to lock the elastically-deformable retaining arm of the clip-on joint when in the assembly position of the security section.

11. The charging cable connector recited in claim 10, wherein the locking section can be fixed via a second clip-on joint onto at least one of the security section or the charging cable connector section such that it cannot be released, the second clip-on joint provided in the receptacle housing when in the assembled position of the locking section.

12. The charging cable connector recited in claim 10, wherein at least one of the security section or the locking section includes at least one passage for the charging cable.

13. The charging cable connector recited in claim 6, wherein the security section further includes a guide element, the guide element when in the assembled position of the security section, configured to engage an assembly recess formed on the housing base section.

14. The charging cable connector recited in claim 13, wherein the assembly recess is elongated and groove-shaped.

15. The charging cable connector recited in claim 1, wherein a sealing face is formed on an internal recess of the charging cable connector, the sealing face configured to accommodate a charging cable seal which fixed to the charging cable connector section.

16. The charging cable connector recited in claim 12, wherein the charging cable connecting aperture has a circular cross-sectional geometry in the form of a bore.

17. The charging cable connector recited in claim 12, wherein the at least one passage has a circular cross-sectional geometry in the form of a bore, and when in the assembled position, the at least one passage and the charging cable connecting aperture are arranged coaxially with one another.

18. The charging cable connector recited in claim 1, wherein the housing base section is embodied in one piece and wherein the electrically-connecting connector unit holds electrical connections for the purpose of electrically connecting the charging cable connector with a mating connector unit of an electric vehicle.

19. The charging cable connector recited in claim 1, wherein the housing base section includes a connecting interface configured to form a connection with different charging cable connector sections that include charging cable connecting apertures of different sizes.

20. The charging cable connector recited in claim 1, further comprising a second charging cable connector section including a charging cable connecting aperture,
- wherein charging cable connecting aperture of the second charging cable connector section is of a different size than the charging cable connecting aperture of the first charging cable connector section, and
- wherein the housing base section includes a connecting interface configured to form a connection with both the first charging cable connector section and the second charging cable connector section.

* * * * *